(12) United States Patent
Mazzei

(10) Patent No.: US 6,866,703 B2
(45) Date of Patent: Mar. 15, 2005

(54) ENHANCED SEPARATION AND EXTRACTION OF GAS FROM A LIQUID UTILIZING CENTRIFUGAL FORCES

(76) Inventor: Angelo L. Mazzei, 11101 Mountain View Rd., Bakersfield, CA (US) 93307

( * ) Notice: Subject to any disclaimer, the term of this patent is extended or adjusted under 35 U.S.C. 154(b) by 50 days.

(21) Appl. No.: 10/352,772

(22) Filed: Jan. 28, 2003

(65) Prior Publication Data

US 2004/0144256 A1 Jul. 29, 2004

(51) Int. Cl.[7] .............................................. B01D 19/00
(52) U.S. Cl. ............................. 96/209; 95/261; 96/212
(58) Field of Search ............................. 95/261; 96/195, 96/208, 209, 216, 212

(56) References Cited

U.S. PATENT DOCUMENTS

| | | | | |
|---|---|---|---|---|
| 2,757,581 A | * | 8/1956 | Boadway et al. | 209/730 |
| 2,757,582 A | * | 8/1956 | Boadway et al. | 209/17 |
| 2,816,490 A | * | 12/1957 | Boadway et al. | 96/195 |
| 2,849,930 A | * | 9/1958 | Boadway et al. | 95/261 |
| 3,331,193 A | * | 7/1967 | Woodruff | 96/195 |
| 3,359,708 A | * | 12/1967 | Barber | 96/167 |
| 3,771,290 A | * | 11/1973 | Stethem | 96/210 |
| 3,800,946 A | * | 4/1974 | Reid et al. | 210/788 |
| 4,097,358 A | * | 6/1978 | Wiseman | 204/270 |
| 5,338,341 A | * | 8/1994 | Mazzei et al. | 96/208 |
| 5,622,545 A | * | 4/1997 | Mazzei et al. | 96/210 |
| 5,755,965 A | * | 5/1998 | Reiber | 210/512.1 |
| 6,019,825 A | * | 2/2000 | Greene et al. | 96/209 |

* cited by examiner

Primary Examiner—Duane S. Smith
(74) Attorney, Agent, or Firm—Donald D. Mon

(57) ABSTRACT

Separation and extraction of gas from a liquid, utilizing centrifugal forces. The area of the lateral spacing between an inner circular centrifugal surface and the outer wall of an internal extractor diminishes toward an outlet. The wall of the extractor is pierced by slots whose walls calm the inward flow of gas into the interior of the extractor.

4 Claims, 4 Drawing Sheets

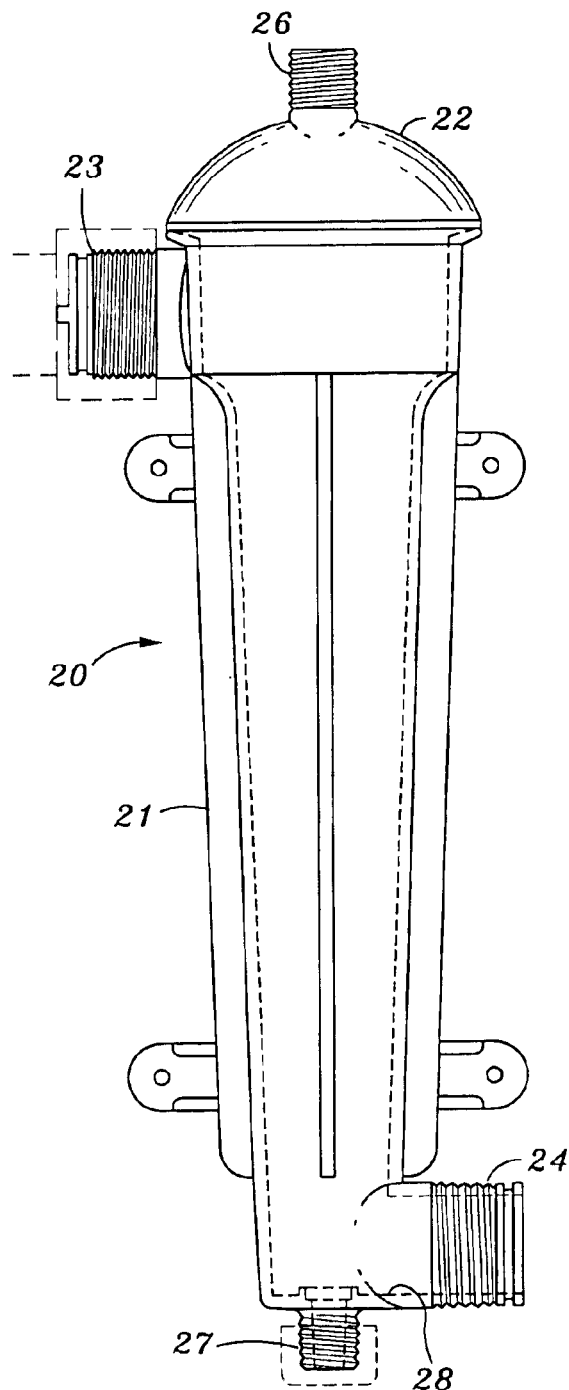
FIG. 1
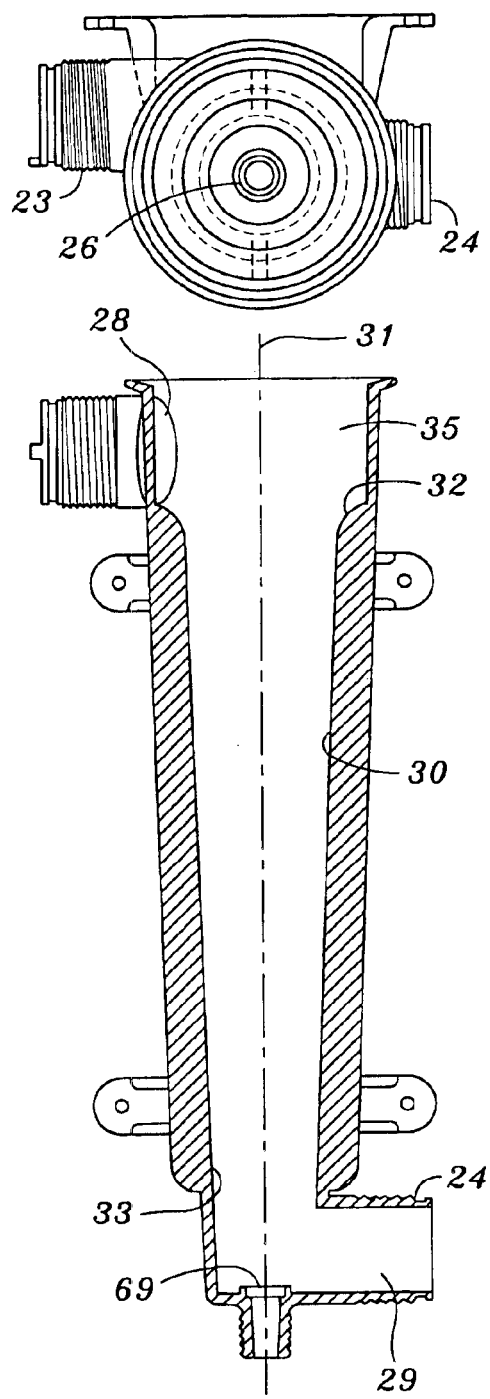
FIG. 3
FIG. 2

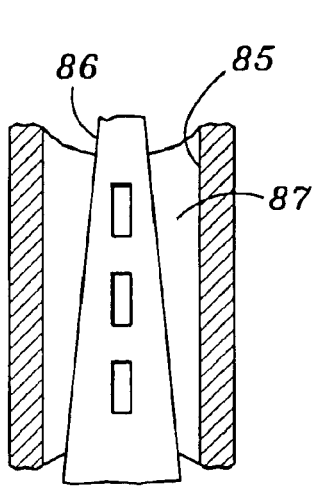
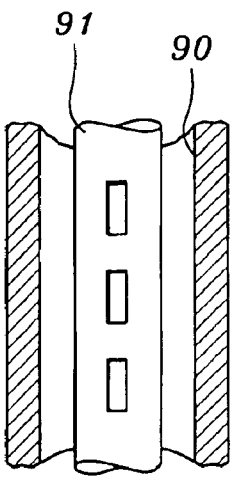
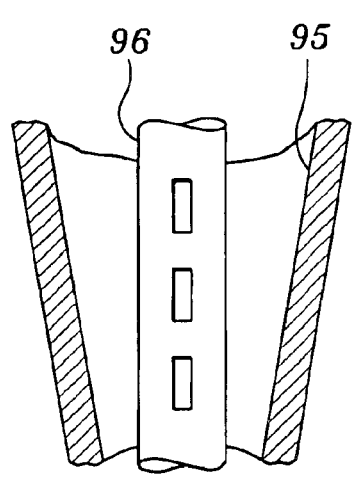
FIG. 8  FIG. 9  FIG. 10
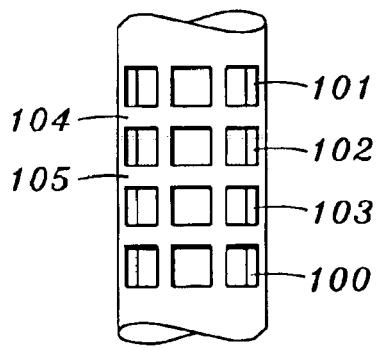
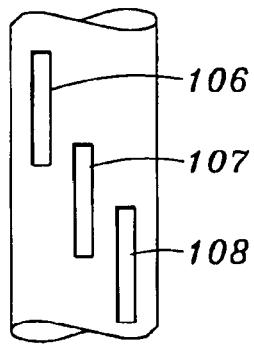
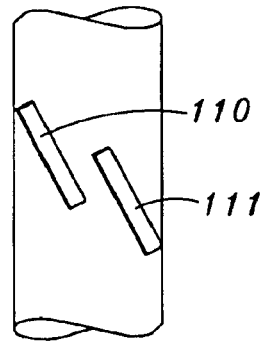
FIG. 11  FIG. 12  FIG. 13
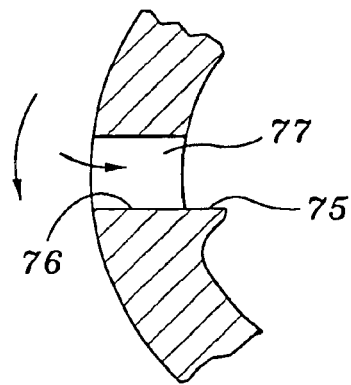
FIG. 14

ENHANCED SEPARATION AND EXTRACTION OF GAS FROM A LIQUID UTILIZING CENTRIFUGAL FORCES

FIELD OF THE INVENTION

Enhanced centrifugal separation and extraction of gas from a liquid utilizing centrifugal force as the driving means.

BACKGROUND OF THE INVENTION

Centrifugal separation of substances having different specific gravities is historical. Cyclone separators for removing sawdust from airstreams are an example of removal of solids from gases. Separation of solids from liquids is shown in Ford U.S. Pat. No. 5,811,006. In this patent the objective is to remove the "heavier" solids from a "lighter" liquid by centrifuging the solids-laden stream against the inner wall of a circular chamber, along which the heavier solid material flows to the bottom, while the liquid rises to and out of the top at the center of the swirling mass.

This concept has been extended to the separation of gases, both free and dissolved, from liquids. In this case, the heavier material is the liquid, and the lighter material is the gas. Examples are shown in Mazzei et at U.S. Pat. Nos. 5,338,341 and 5,622,545, and in Mazzei U.S. Pat. Nos. 5,674,312 and 6,193,893. It is this latter group of patents with which this invention is concerned. This invention is not concerned with elimination of solids from a liquid stream, but instead is concerned with removal of gases from a liquid stream.

The separation (extraction) of gases from liquids is a matter of great importance in many fields. It is particularly important when the gases to be separated are undesirable for several possible reasons. Such reasons might include their use and recovery as "sweeping" gases to carry with them some other existing gas of greater risk, or gases which involve their own problems such as corrosion or pollution.

Another, and rather surprising application is the separation of gases from liquid stream whose flow is to be measured. Water used in oil extraction systems is somewhat oily and frequently includes methane. The presence of the gas or gases frustrates the accurate measurement of the water flow. It is a useful function of this invention to remove the gases prior to measurement, thereby enabling accurate measurement. It is possible to return extracted gases to the liquid stream after measurement, which in some circumstances may be desirable.

While this invention will find its greatest employment separating gases from water with little or no saline content, it can be use to de-gas any liquid. Waters with considerable salinity, especially seawater are readily treated. The recovery of gases from such waters is otherwise usually quite difficult. therefore there is no limitation on the type of liquid. It merely must be amenable to rapid flow through the device.

In whatever event, the objective is to reduce as much as possible the presence of the gas in a liquid stream. The principal driving means is derived from the difference in the specific gravities of liquids and gases. The specific gravity of any liquid is far greater than that of any gas, so that centrifugal forces can separate gases from a liquid when in the free state.

There is another class of forces which are derived from pressure in the liquid. These are defined by Henry's Law, which relies on the difference between pressures perceived by the gas in the liquid and the gas phase contiguous to it. The lower pressures in the liquid caused by the rapid movement of the fluid through a reducing cross-section considerably reduce the solubility of the gases. This effect is of much less importance compared with the centrifugal forces, but is worth pursuing in some applications.

With special attention to U.S. Pat. Nos. 5,338,342 and 5,622,545, gases therein are separated through a central horizontally-slotted cylindrical tube located co-axially in a cylinder. One objective in patents is to contain in a quieter central region a quantity of water and gas, from which the gas rises and exits the system. This is a classical mass-separation technique, which only incidentally reduces the angular momentum of the liquid stream and does not optimally affect the pressure and velocity in the vortex chamber.

Such a usual centrifugal arrangement characterized by the above patents still involve a lively and undisciplined environment. If the objective is to rid the system of gas, a lively central region is not to be preferred. Instead, this invention proposes to combine an enhanced very forceful and lively centrifugal region of a liquid stream containing the gas, with an internal quiescent region where the separated gas can quietly rise from the system.

It is interesting to observe in a separator without a central tube, the conditions of the incoming stream, the whirling mix of liquid and gas as they begin to separate, and the lively vortex at the center, whose alignment, shape and length vary and move around, and is always rapidly rotating. Especially there is a rotation of the interface between water and the separating gases, this being the boundary of the vortex. It can readily be appreciated that the vortex itself and the gases in it are in vigorous motion.

In said U.S. Pat. Nos. 5,338,341 and 5,622,545 one of the inventors therein, and the sole inventor herein, attempted to stabilize the vortex by providing horizontal slots through the wall of a vertical cylinder located inside of a vertical, coaxial cylinder. The objective there was to limit the vortex to a defined region, and to a significant extent it did and does improve the separation of the gases from the water. However, it has not proved as effective as the instant invention, particularly in the removal of certain gases that are difficult to remove, for example radon. Also, its performance on seawater was less than optimal. The device of this function works well removing gases from seawater, which has always been regarded as a difficult task.

In this invention, the slots in the internal tube will not lie in planes normal to the axis of the tube, but rather at an angle to it, and thereby will provide a wall or walls that will be impinged upon by the fluids.

In addition, the forgoing earlier separator tended to require a considerable "foot print" in the sense of occupied real estate for its installation. The present device requires only a significantly smaller footprint, and is surprisingly small for the work that it does. In fact, one of its very useful embodiments is only about 15 inches tall and about 4.6 inches outer diameter and routinely treats a flow volume between about 5 and about 50 gallons per minute depending on the inlet and outlet pressures that are used.

While only purely cylindrical elements are shown in said patents, and they can be utilized in this invention, significant improvements have been obtained with the use of at least one tapered element (preferably both) which reduces the lateral dimension of the whirling stream as it flows to a lower outlet. This results in a faster linear speed, a greater centrifugal force, and a larger gradient for gas separation.

BRIEF DESCRIPTION OF THE INVENTION

A separator according to this invention includes a housing with an injection port and a water exit port, said housing including an interior centrifuge wall with a linear central axis and a circular lateral cross-section that forms the outer boundary of a centrifuge section, said ports being axially spaced apart from one another.

A hollow extractor is disposed inside of the centrifuge wall with an outer wall which is laterally spaced from said centrifuge wall. The extractor has a substantial lateral wall thickness and a plurality of slots through its wall which are not in planes normal to the central axis, but which instead lie in imaginary planes that are parallel to it, or which form a substantial angle with said axis, and which have a substantial axial length. The inner wall of the extractor forms a gas chamber that extends axially toward an upper gas exit port.

According to a preferred but optional feature of the invention, either the centrifuge wall or the extractor wall (or both) is or are tapered so as to reduce the lateral dimension of the centrifuge chamber as it approaches the water exit port.

According to yet another preferred but optional feature of the invention, each slot is bounded in part by a sidewall which faces toward the whirling water so as to be impacted by gas or whatever else strikes it, thereby to reduce its angular momentum and quiets the lateral flow of fluid into the gas chamber.

According to yet another preferred but optional feature of the invention, the extractor is provided as unitary insert fitted into the centrifuge chamber.

The above and other features of this invention will be fully understood from the following detailed description and the accompanying drawings, in which:

BRIEF DESCRIPTION OF THE DRAWINGS

FIG. 1 is an external side view of the presently preferred embodiment of a separator according to the invention;

FIG. 2 is an axial cross-section of the body of the separator of FIG. 1, with its cap removed;

FIG. 3 is a top view of FIG. 2;

FIGS. 8–10 schematically show different useful angular relationships between the centrifuge wall and the extractor wall;

FIGS. 11–13 show different slot patterns; and

FIG. 14 is a detail of a useful diverter adjacent to a slot.

DETAILED DESCRIPTION OF THE INVENTION

Figure 6:
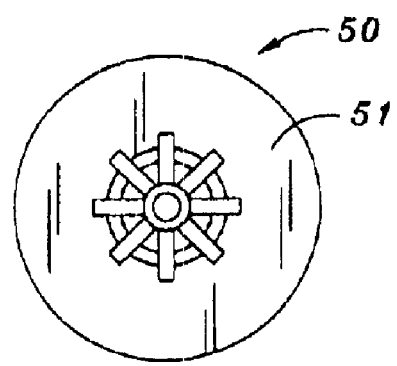
FIG. 6 is a top view of FIG. 4.

The presently-preferred embodiment of a separator 20 according to this invention is shown in FIGS. 1–7. FIG. 1, shows its outer body 21, cap 22 closing its upper end, injection fitting 23 near its upper end, water outlet fitting 24 near its lower end, gas outlet fitting 26 at its upper end, and a drain fitting 27 at its bottom end. Injection port 28 enters through fitting 23. Water exit port 29 exits through fitting 24.

A surface 30 of revolution, herein called the "centrifuge wall" is centered on a central axis 31 which extends from the top end 32 to the bottom end 33 of the separator. In the preferred embodiment, this is a frusto-conical surface tapering narrowly toward the bottom end of the housing.

It includes a diametrically enlarged injection chamber 35 into which an injection port 28 (which is preferably a nozzle) projects water to be de-gassed tangentially into the separator. Region 35 is somewhat enlarged. The spinning (whirling) movement of the gas-containing liquid starts in this region, and the stream flows downwardly.

Centrifugal wall 30 tapers inwardly and gradually toward its lower end, from which water exit port 29 discharges water from which gas has been extracted.

Figure 7:
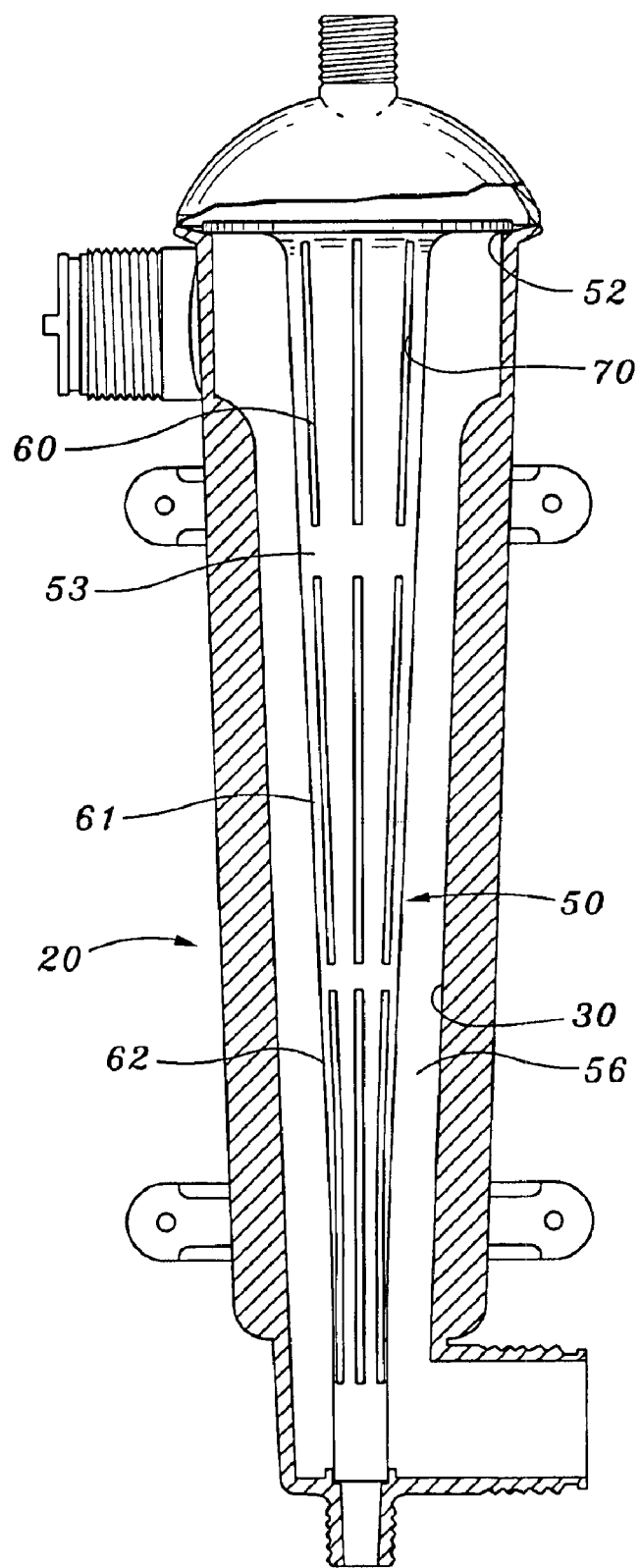
FIG. 7 is an axial cross-section showing the extractor of FIG. 4 installed in the body of FIG. 2.

Extractor 50 (FIG. 4) is fitted in the body of this device, as shown in FIG. 7. The extractor has a top flange 51 which when installed fits against upper shoulder 52 on the body, and is held in place by cap 22. This flange closes the upper end of injection chamber 35.

Below the flange, the depending portion 53 of the extractor is frusto-conical. Conveniently it will be a hollow molded plastic material with a constant wall thickness, having an external wall surface 54 and an internal wall surface 55. Surfaces 54 and 55 will preferably be identically tapered, although the taper angles can differ. As best shown in FIG. 7, extractor 50 will fit in the body, leaving between its external wall surface and the centrifuge wall 30 of the body, a centrifuge chamber 56 that directly communicates with injection chamber 35.

The conical angles of wall 30 and surface 54 will conveniently be equal, perhaps about 4 degrees included angle. Because of their narrowing taper, the net lateral cross-section area of the centrifuge region decreases. Because the same amount of liquid must pass, the velocity will increase and the pressure will decrease. The gas will have an increased force gradient for it to migrate to the center. The gas will have a lesser solubility which although it may be rather small, still it can be an advantage.

Three sets 60, 61, 62 of four slots each extend axially along and through the extractor. The slots are evenly spaced apart around the extractor, while the sets of slots are spaced from each other. Slot 63, which is typical of all of the slots, lies in a respective imaginary plane which includes the central axis. Each slot has a width 65, a depth 66 equal to the thickness of the extractor wall, and a length 67.

At the lower end of the extractor, a foot 68 fits against a shoulder 69 around the drain port, so that any solids which may have accumulated in the extractor can be drained away without removing the extractor from the body.

The simplest slot arrangement is shown in FIGS. 1–7. When whirling fluid enters a slot, it encounters sidewall 70 of the slot, which decelerates it and deflects it into the central quiescent region 71.

However, it will sometimes be desirable to provide means which will have an even greater decelerating effect. Such a means is shown in FIG. 14, where a deflector 75 adjacent to the inner edge 76 of slot 77 is shown which will further direct the flow of fluid either radially inward, or even with some reversal of motion. The effect, with or without the additional deflector is to create a quiescent region inside the extractor, without significant turbulence, and with minimal rotation. At the top this region will contain mostly gas. Toward the bottom it may be flooded with water.

Figure 4:
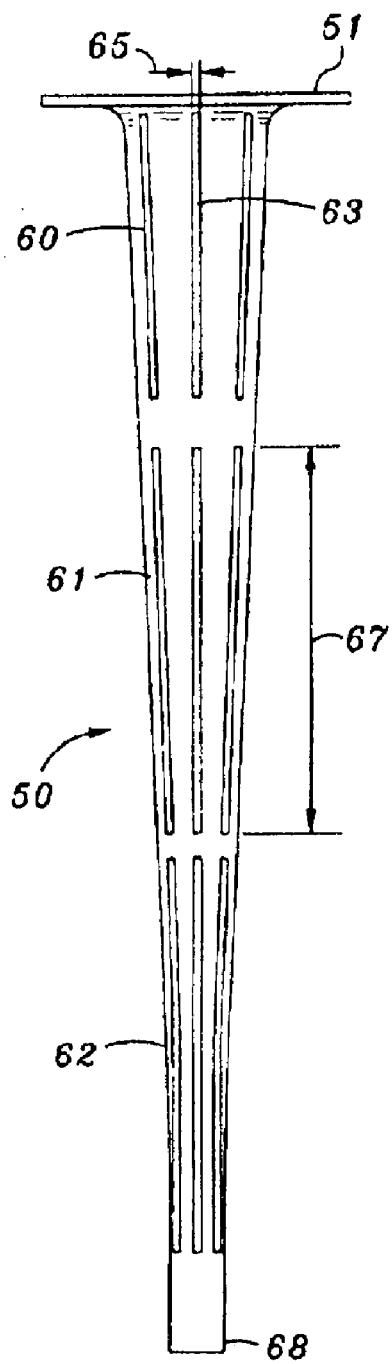
FIG. 4 is a side view of an extractor for use with the body of FIG. 1.
Figure 5:
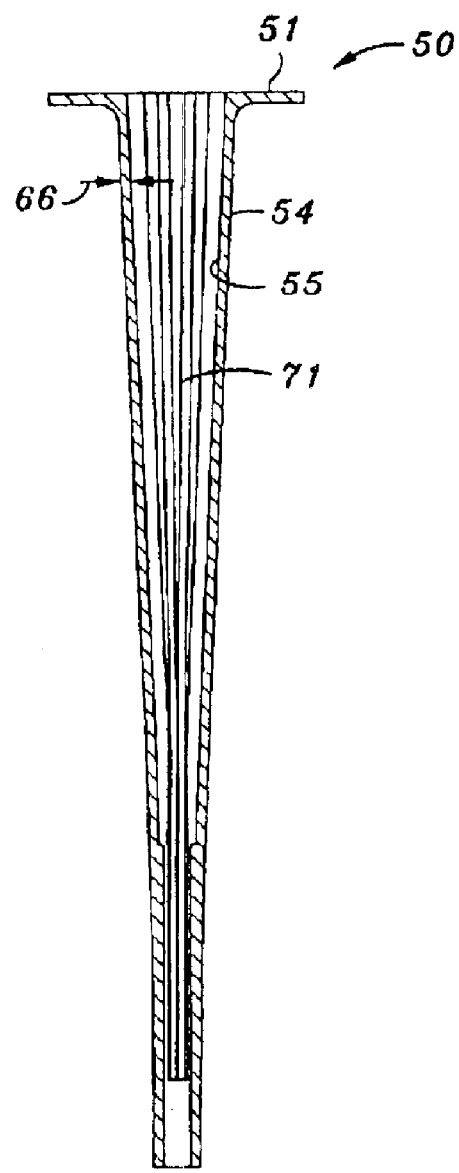
FIG. 5 is an axial cross-section of FIG. 4.

FIGS. 1–7, and in particular FIGS. 4–6, show a conveniently manufactured extractor, readily prepared with injection molding techniques, with or without secondary-operations such as mechanical machining of the slots. If preferred for economy of tooling, the slots could be machined. The objective is to provide an extractor with passages which receive fluids in such a way that the quiescent region inside the extractor is separated from the rapid violent motion in the separation chamber. Locating the slots near where the gas vortex boundary will be located is a first consideration.

The second consideration is to use the wall thickness of the slots as a means to isolate the quiescent region by changing the direction of flow from tangential to radial, by stopping the tangential flow with the wall of the slot. Then the gas can quietly flow into the quiescent region, and out through the gas exit port. The gas exit port will be connected to a pressure-sensitive relief valve which maintains a proper pressure in the separator.

The embodiment illustrated in FIGS. 1–7 is at once the most effective and the most readily manufactured embodiment. However, different slot patterns and different angular relationships between the centrifuge wall and the extractor are within the scope of this invention.

FIG. 8 shows an external centrifuge wall 85 which is cylindrical, and an internal extractor which is tapered, but whose external wall 86 is reversely tapered compared to the extractor of FIG. 4. It increases in diameter toward the bottom. Notice that the centrifuge region 87 between them reduces in lateral dimension as it extends toward the bottom.

FIG. 9 shows an external centrifuge wall 90 and an internal extractor 91, both of which are cylinders. Here the lateral dimension (lateral thickness) of the centrifuge region is constant, but slots according to this invention are used. The advantages of the slots are employed, but not the reduction of thickness of the centrifuge region. Therefore only some of the advantages of this invention are attained.

FIG. 10 shows an external centrifuge wall 95 which tapers narrowly toward its bottom end and an internal extractor 96 which is cylindrical. All of the advantages of the embodiment of FIGS. 1–7 are attained.

In all of the arrangements of FIGS. 8–10, slots (not shown) of any configuration according to this invention can be formed in the wall of the extractor. Sets of straight longitudinal slots are preferred for their simplicity and demonstrated effectiveness. However, at least some of the benefits of this invention can be attained with the use of other types of slots and slot patterns.

For example, FIG. 11 shows the use of series of spaced apart rectangular, shorter slots 100, 101, 102 in the wall of an extractor 103. These short slots are spaced apart by imperforate regions 104, 105, for example. Their width is similar to that of the slots in FIG. 4. In fact, the entire surface of the extractor can be studded with these, the sidewall facing toward the stream action as before. These may be thought of as "interrupted" long slots.

FIG. 12 shows slots 106, 107, 108 in a staggered array, rather than in an aligned group.

FIG. 13 shows slots 110, 111 which are slanted at a substantial angle 112 relative to the vertical. Such slots are not preferred because of the component of downward flow along their sidewall, but still can be employed to some advantage.

All of the slot embodiments of FIGS. 11–13 can be formed in any of the extractor arrangements. Their slot widths and depths will be about the same as those of FIG. 4.

A suitable separator according to FIGS. 1–7 can be made with the following dimensions, which will accommodate flow rates between about 5 and about 50 gallons per minute.

Injection chamber diameter 3.6 inches
Injection chamber height 2.12 inches
Centrifuge chamber height to water outlet center—12.94 inches
Centrifuge wall lower diameter—2.6 inches
Centrifuge wall lower diameter—2.0 inches
Centrifuge wall taper—about 4 degrees included angle
Extractor length flange to tip—15.88 inches
Slot length—about 3.8 inches
Slot width—about 0.80 inches
Extractor taper angle—about 4 degrees included angle The bottom ends of the housing and of the extractor will have dimensions to fit the assembly as shown. The various sizes and capacities can be scaled from the above or determined by experiment, using the criteria discussed above. The taper angles need not be uniform over the entire length. They may be changed along the length as desired.

While the examples given relate to water streams, it is to understood that they relate also to other liquids as well, as discussed above.

The term "quiescent" as used herein relates to fluid movement in which much of the rotational velocity has been removed while moving through the slots. It does not require total stillness.

This invention is not to be limited by the embodiments shown in the drawings and described in the description, which are given by way of example and not of limitation, but only in accordance with the scope of the appended claims.

What is claimed is:

1. A centrifugal separator for separating gases from a water stream comprising:

a housing including an internal centrifuge wall, said wall having a linear central axis with circular cross-section from end to end so as to form a centrifuge chamber;

a hollow extractor in said centrifuge chamber, coaxial with said centrifuge wall, said extractor having an outer wall facing and spaced from said centrifuge wall, and an inner wall forming a quiescent region inside said extractor, a plurality of slots extending between said walls of said extractor, said slots having a dimension of length and width, said slots having a sidewall facing laterally relative to said axis, said slots being spaced axially and also laterally apart from one another;

an inlet port entering into said separator;

an injection nozzle from said inlet port discharging a stream of water and gas to be separated tangentially into said centrifuge region and against said centrifuge wall, a water outlet from said centrifuge region axially spaced from said nozzle, and a gas outlet port through said housing from said quiescent region.

2. A centrifugal separator for separating gases from a water stream comprising:

a housing including an internal centrifuge wall, said wall having a linear central axis with circular cross-section from end to end so as to form a centrifuge chamber;

a hollow extractor in said centrifuge chamber, coaxial with said centrifuge wall, said extractor having an outer wall facing and spaced from said centrifuge wall, and an inner wall forming a quiescent region inside said extractor, a plurality of slots extending between said walls of said extractor, said slots having a dimension of length and width, said slots having a sidewall facing laterally relative to said axis, and a deflector surface extending from said sidewall into said quiescent region;

an inlet port entering into said separator;

an injection nozzle from said inlet port discharging a stream of water and gas to be separated tangentially into said centrifuge region and against said centrifuge wall, a water outlet from said centrifuge region axially spaced from said nozzle, and a gas outlet port through said housing from said quiescent region.

3. A centrifugal separator for separating gases from a water stream comprising:

a housing including an internal centrifuge wall, said wall having a linear central axis with circular cross-section from end to end so as to form a centrifuge chamber;

a hollow extractor in said centrifuge chamber, coaxial with said centrifuge wall, said extractor having an outer wall facing and spaced from said centrifuge wall, and an inner wall forming a quiescent region inside said extractor, a plurality of slots extending between said walls of said extractor, said slots having a dimension of length and width, said slots having a sidewall facing laterally relative to said axis, said slots being spaced axially and also laterally apart from one another;

said outer wall of said extractor and said centrifuge wall taper relative to said central axis, whereby to reduce the net cross-section area of the centrifuge region as it extends from said inlet end to said outlet end, and in which both of said walls are tapered, reducing in diameter from said inlet end to said outlet end;

an inlet port entering into said separator;

an injection nozzle from said inlet port discharging a stream of water and gas to be separated tangentially into said centrifuge region and against said centrifuge wall, a water outlet from said centrifuge region axially spaced from said nozzle, and a gas outlet port through said housing from said quiescent region.

4. A centrifugal separator for separating gases from a water stream comprising:

a housing including an internal centrifuge wall, said wall having a linear central axis with circular cross-section from end to end so as to form a centrifuge chamber;

a hollow extractor in said centrifuge chamber, coaxial with said centrifuge wall, said extractor having an outer wall facing and spaced from said centrifuge wall, and an inner wall forming a quiescent region inside said extractor, a plurality of slots extending between said walls of said extractor, said slots having a dimension of length and width, said slots having a sidewall facing laterally relative to said axis, and a deflector surface extending from said sidewall into said quiescent region;

said outer wall of said extractor and said centrifuge wall taper relative to said central axis, whereby to reduce the net cross-section area of the centrifuge region as it extends from said inlet end to said outlet end, and in which both of said walls are tapered, reducing in diameter from said inlet end to said outlet end;

an inlet port entering into said separator;

an injection nozzle from said inlet port discharging a stream of water and gas to be separated tangentially into said centrifuge region and against said centrifuge wall, a water outlet from said centrifuge region axially spaced from said nozzle, and a gas outlet port through said housing from said quiescent region.

* * * * *